INVENTORS
MARVIN FELCHECK
NANJUNDIAH N. MURTHY
BY
ATTORNEY

Jan. 10, 1967 M. FELCHECK ETAL 3,296,960
ELECTRONIC CONTROL OF PRINTER IN RESTAURANT BILLING SYSTEM
Filed Feb. 3, 1965 8 Sheets-Sheet 3

INVENTORS
MARVIN FELCHECK
NANJUNDIAH N. MURTHY
BY
ATTORNEY

Jan. 10, 1967  M. FELCHECK ETAL  3,296,960
ELECTRONIC CONTROL OF PRINTER IN RESTAURANT BILLING SYSTEM
Filed Feb. 3, 1965                                       8 Sheets-Sheet 8
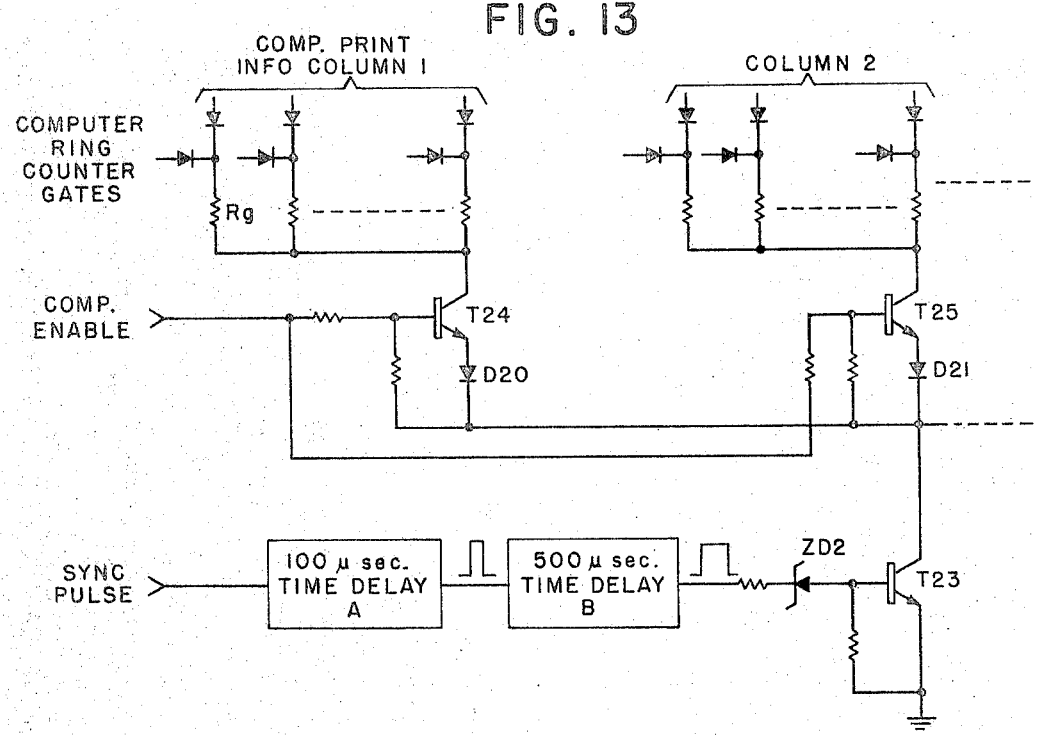
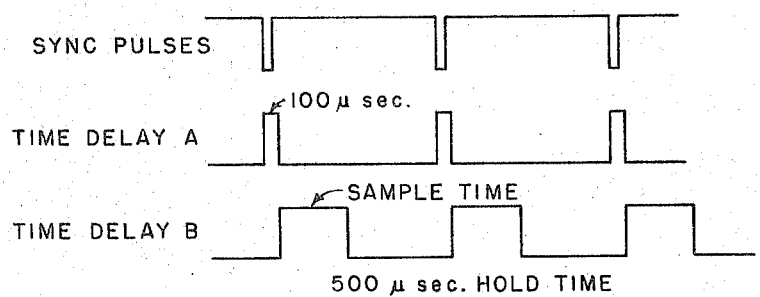
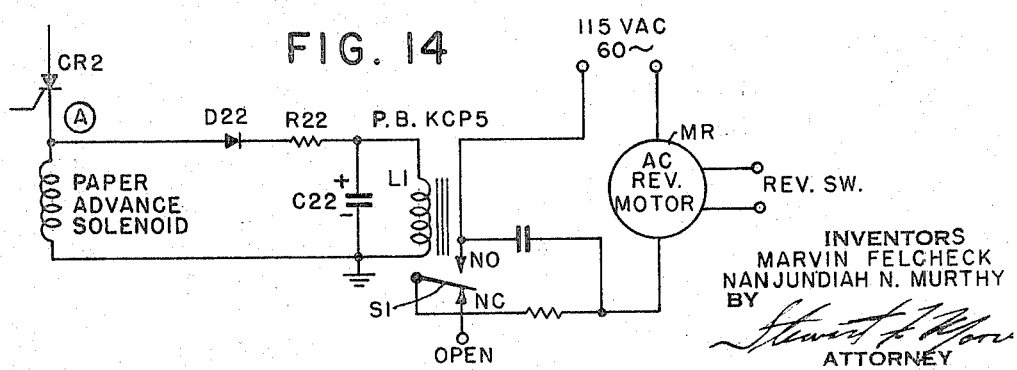
INVENTORS
MARVIN FELCHECK
NANJUNDIAH N. MURTHY
BY
ATTORNEY United States Patent Office 3,296,960
Patented Jan. 10, 1967

3,296,960
ELECTRONIC CONTROL OF PRINTER IN RESTAURANT BILLING SYSTEM
Marvin Felcheck, Bayside, N.Y., and Nanjundiah N. Murthy, Norwalk, Conn., assignors to American Machine & Foundry Company, a corporation of New Jersey
Filed Feb. 3, 1965, Ser. No. 430,052
16 Claims. (Cl. 101—93)

The invention relates to data processing or control systems and particularly to the electronic circuitry used in such systems for controlling the operation of indicating apparatus, such as a printer for printing numerical data or related sales information in a billing system for a restaurant or other sales establishment.

A general object of the invention is to provide efficient electronic control of such data indicating or printing apparatus, and of the controlling computer or other data source from such apparatus.

A more specific object is to convert signals representing price or related information in connection with the sale of commodities on separate orders from customers received from an electrical computer or other source in a restaurant or other sales establishment into electrical signals suitable for providing fast and properly timed operation of a high speed electromechanical printer to print this information in suitable form on a customer's bill for each of the orders.

Another object is to furnish signals indicating the status of the printing cycle within the printer to the controlling computer or other signal source for timing the information and command signals produced thereby.

Related objects are to generate and transmit to the printer signals causing it to advance the paper or other printing medium therein by one line without printing, if desired; or to cause the operation of the printer to provide automatic cutting off or shearing of the paper or other printing medium to form a bill for each customer order.

The fast operating printer with which the electronic circuitry in accordance with the invention is used may be of a type combining electronic and electromechanical principles for printing from information signals furnished by a data processing system, such as an electrical computer. For example, it may be a modification of the electro-mechanical printer disclosed in the U.S. patents to F. H. Shepard, Jr., No. 2,787,210, issued Apr. 2, 1957, and No. 2,997,632, issued Aug. 22, 1961. The modifications in one embodiment may include a character drum which when the printer is in use continuously rotates at a high speed in the order of 700 r.p.m., this drum consisting of five type wheels, one for each print column, respectively embossed around their peripheries with five sets of numerics each running from 0 to 9 and an X. In order to obtain knowledge as to the position of the character drum at any instant, a reluctance (magnetic) head is mounted in close proximity to a timing gear affixed to the end of the rotating drum. This timing gear, originally a 60-tooth gear, has ten teeth removed therefrom so as to provide five sets of ten teeth each separated by a gap of two missing teeth.

By the use of suitable electronic circuitry (to be fully described hereinafter) associated with the timing gear, a synchronization (sync) pulse is generated for each tooth on the timing gear plus a relatively wide index pulse for each gap of two missing teeth. The wide index pulse is used to set a multi-stage shift register, to be referred to hereinafter as the Character Scanner, to its first stage, and the sync pulses are utilized to step the Character Scanner from stage to stage in synchronism with the characters on the drum of the printer.

The data source may be an electrical computer for computing the prices of each commodity sold to a customer on a single order, such as disclosed in the co-pending patent application of M. Felcheck, Ser. No. 297,118, filed July 23, 1963, or in the co-pending patent application of Alpert, Berler and Townsend, Ser. No. 219,222, filed Aug. 24, 1962.

Other apparatus utilized in the circuits of the invention are a Scan Complete Generator operated from the Character Scanner when it reaches its last stage to control apparatus for clearing the scanner of all information, and electronic gating and driving circuits operated from the output of the Scanner or by command signals produced by the associated computer to produce suitable printer operating signals.

A feature of the invention is a Coincidence Matrix utilizing gate sampler techniques for translating the numerical price or other sales information received from the computer or other data source into properly timed pulses for triggering the hammer firing circuits of the printer and causing the appropriate characters to be printed in the customer's bill.

Other features comprise generating the end of a scan signal using internal time delay rather than an extra sync pulse; printing during "cocking" of a paper shift solenoid to decrease print signal time; and utilizing a single wheel in the Printer to develop both the character pulses and relatively wide index pulses.

These and other objects and features of the invention will be better understood from the following detailed description thereof when read in conjunction with the various figures of the accompanying drawings in which.

Figure 1:
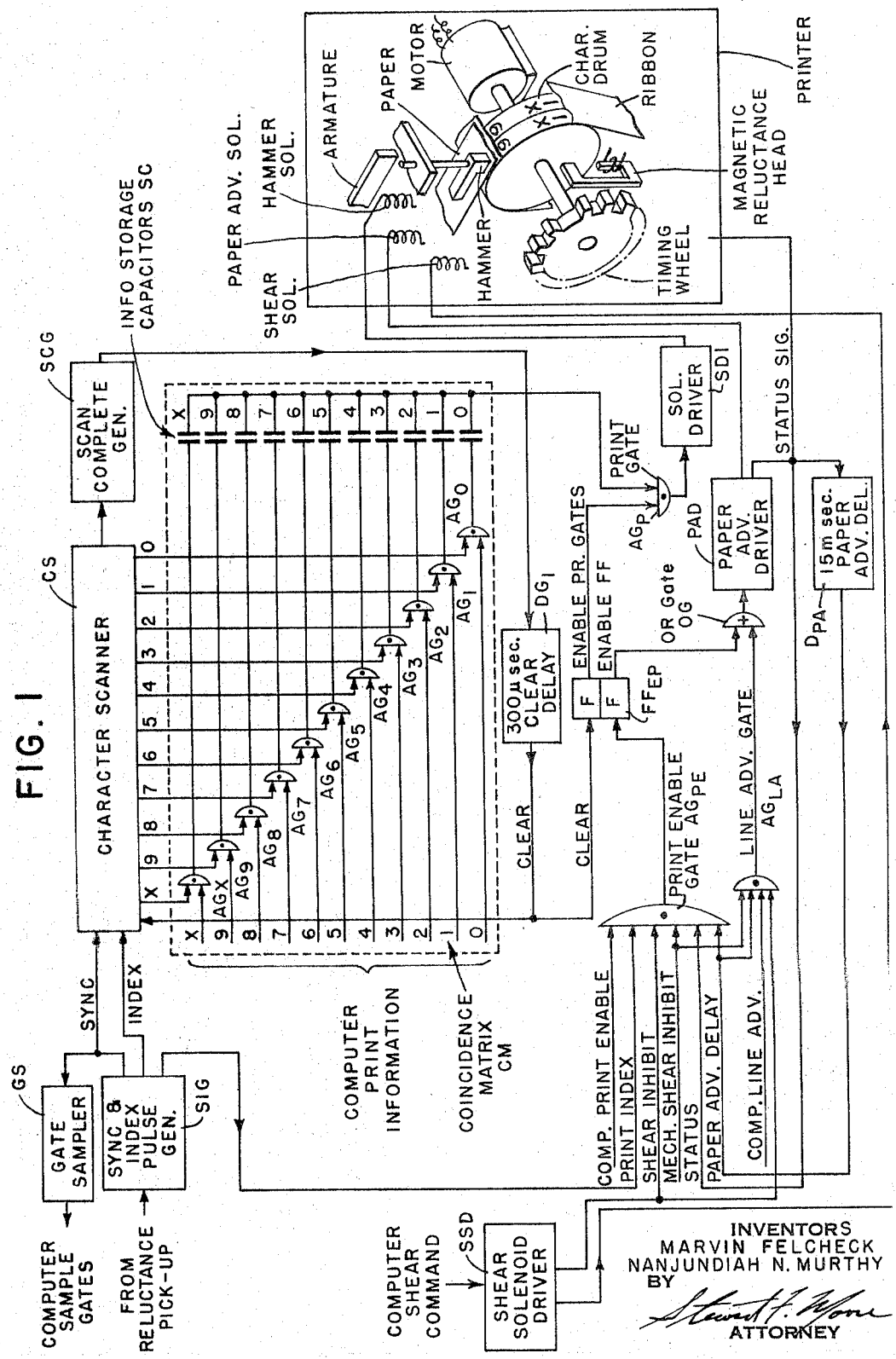
FIG. 1 shows in block diagrammatic form the system of the invention employed for controlling the operation of an electromechanical printer of the general type described above in a customer's billing system for a restaurant or other sales establishment under control of the electrical computer furnishing price information and command signals.
Figure 3:
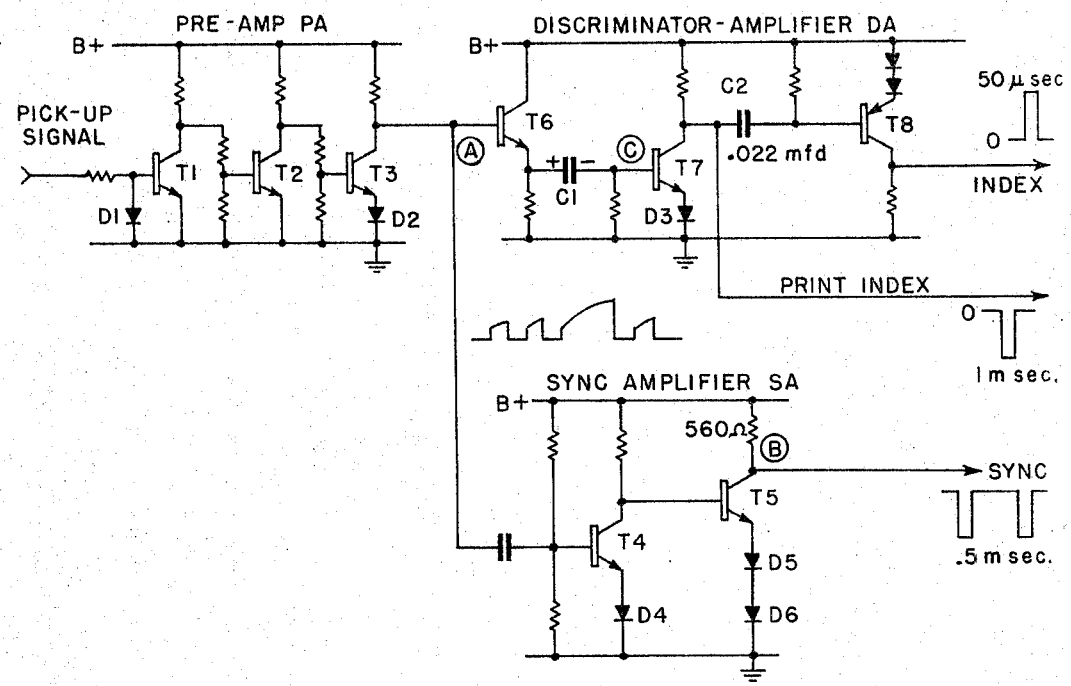
FIG. 3 is a circuit schematic of the sync and index pulse generator used in the system of FIG. 1.
Figure 5:
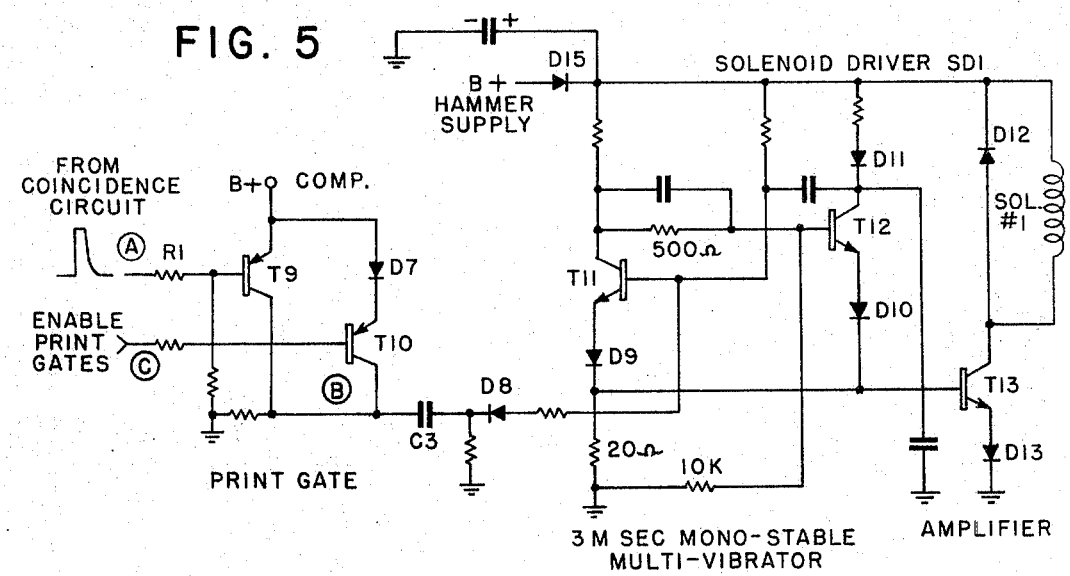
Figure 4A:
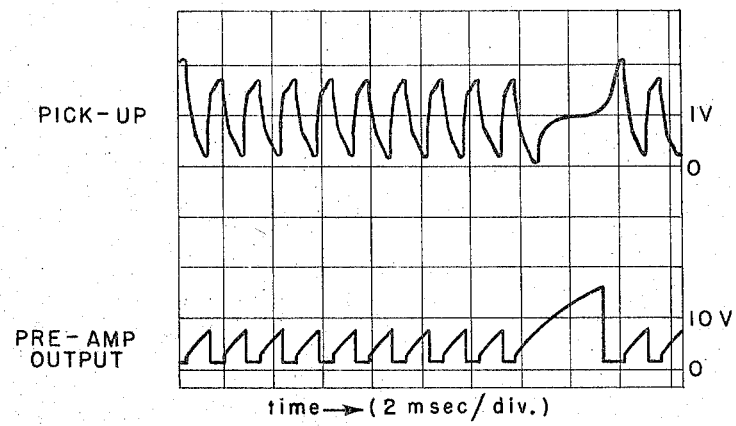
Figure 4B:
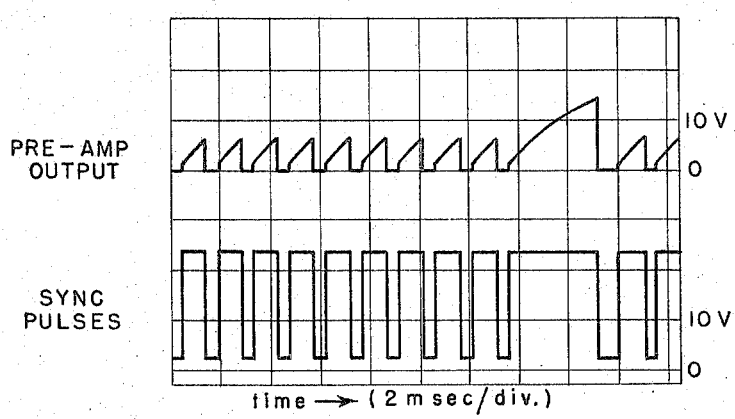
Figure 4C:
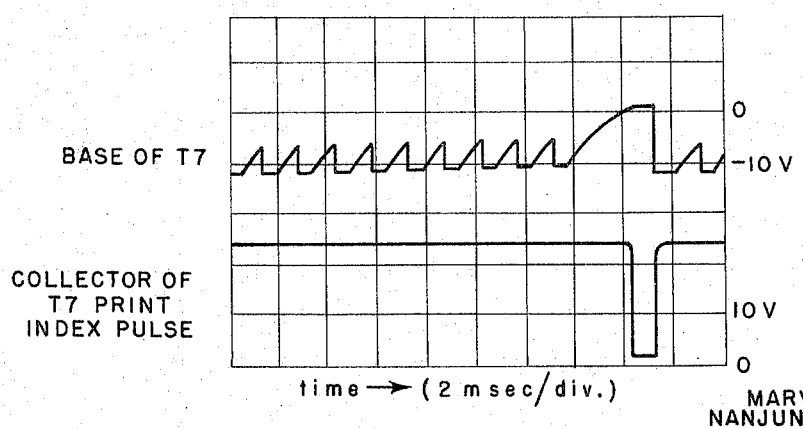
Figure 6:
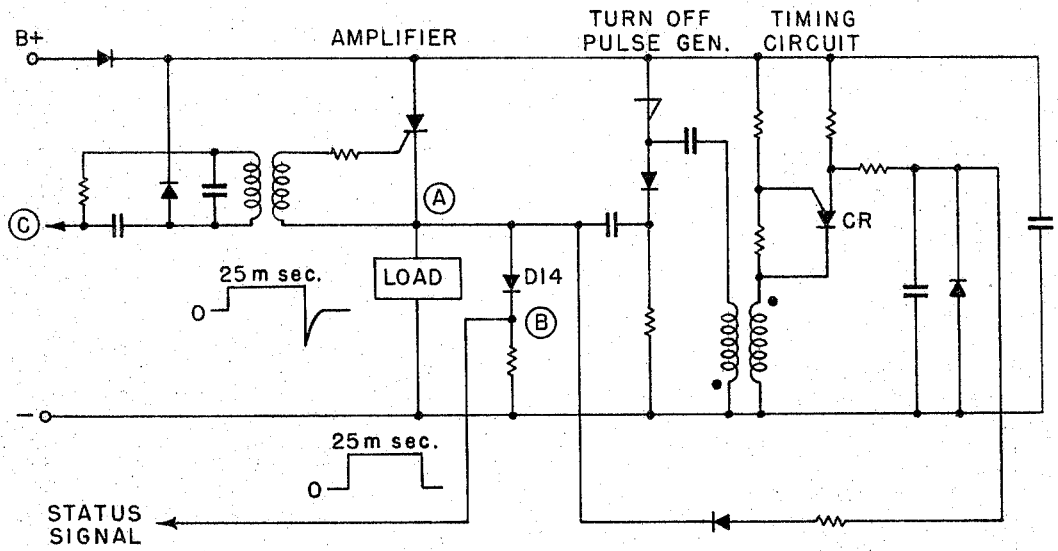
Figure 7:
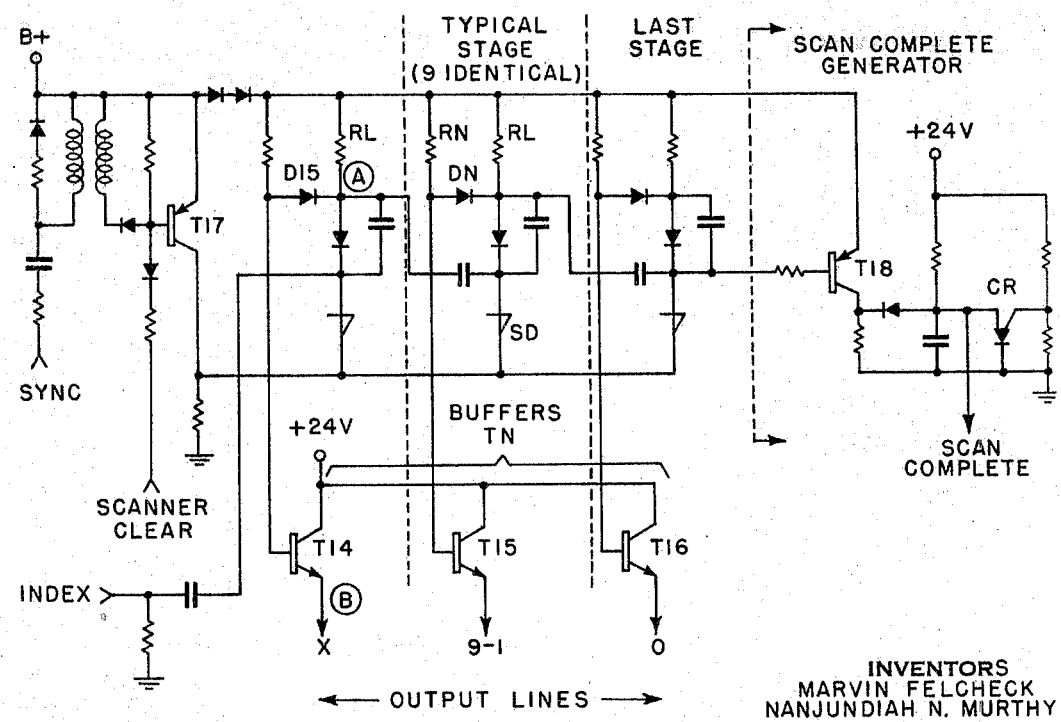
Figure 8:
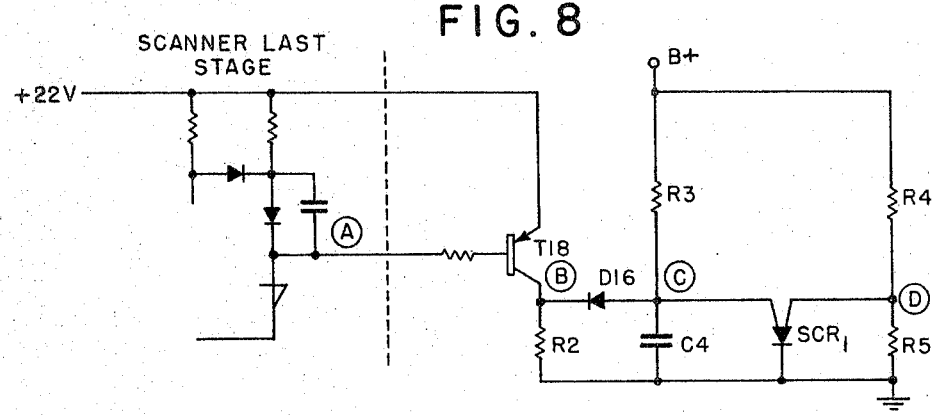
Figure 9:
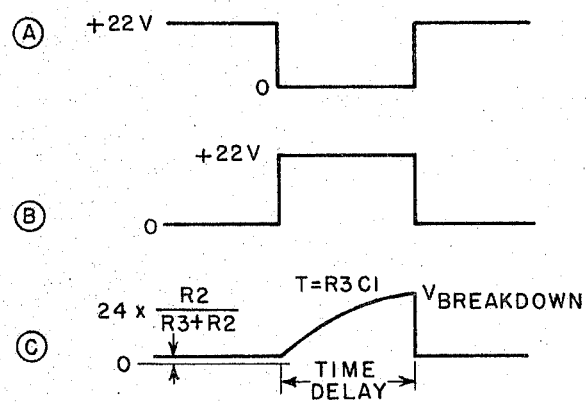
Figure 10:
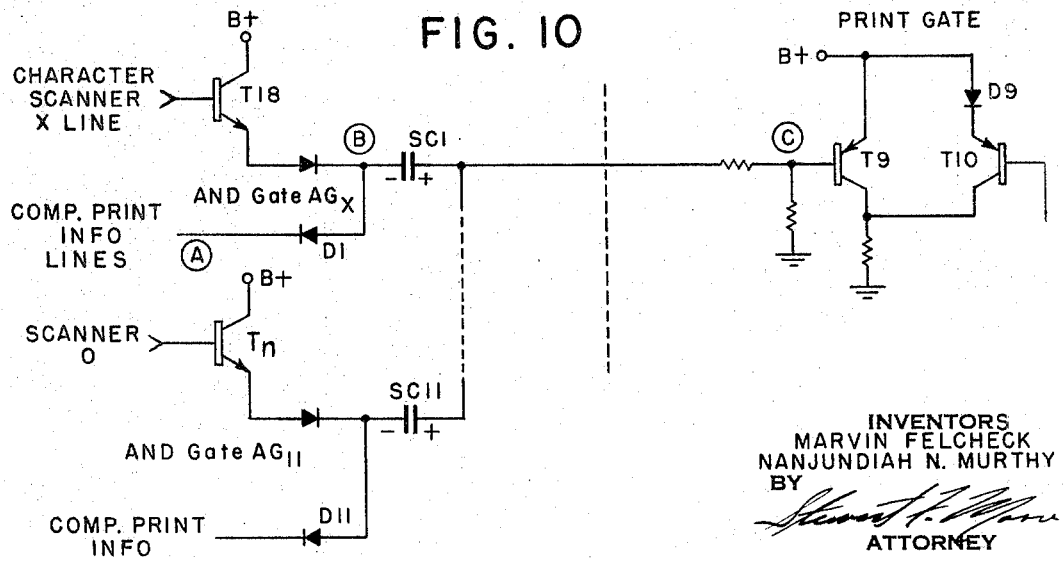
Figure 11:
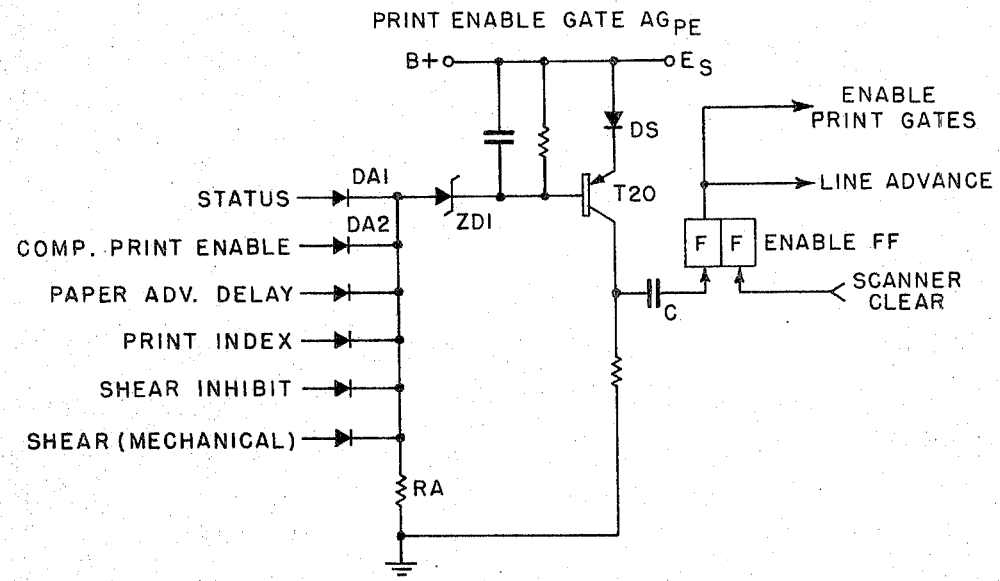
Figure 12:
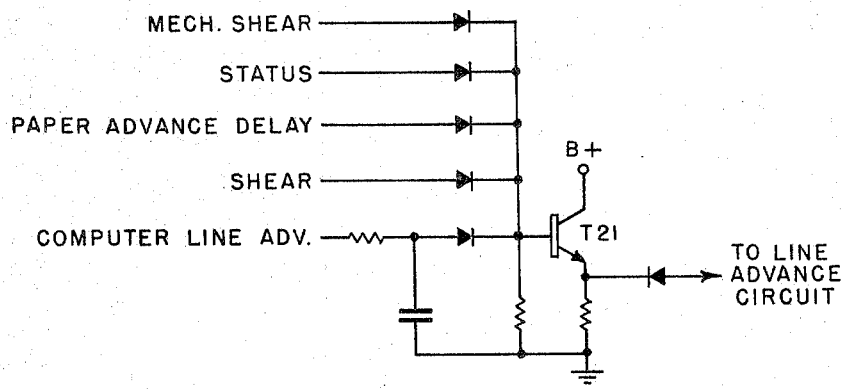

FIGS. 4a, 4b and 4c, respectively, show oscillograms of the input, output and intermediate signals produced in the circuit of FIG. 3;

FIG. 5 is a circuit schematic of the Print Gate and associated Solenoid Driver used in the system of FIG. 1;

FIG. 6 is a circuit schematic of the Paper Advance Driver used in the system of FIG. 1;

FIG. 7 is a circuit schematic of the Character Scanner and associated circuits used in the system of FIG. 1;

FIG. 8 is a circuit schematic of the Scan Complete Generator used in the system of FIG. 1;

FIG. 9 shows the waveforms of the signals produced in the generator of FIG. 8;

FIG. 10 is a circuit schematic of the Coincidence Matrix and associated circuits used in the system of FIG. 1;

FIG. 11 is a circuit schematic of the Print Enable Gate and associated circuits used in the system of FIG. 1;

FIG. 12 is a schematic circuit of the Line Advance Gate used in the system of FIG. 1;

FIG. 13 shows the circuit schematic (partly in block diagrammatic form) of a Gate Sampler used in the system of FIG. 1; and FIG. 13A the waveforms of signals at various points in this circuit; and FIG. 14 is a circuit schematic of an intermittent Ribbon Drive Circuit which may be used in connection with the Printer in FIG. 1.

Figure 2:
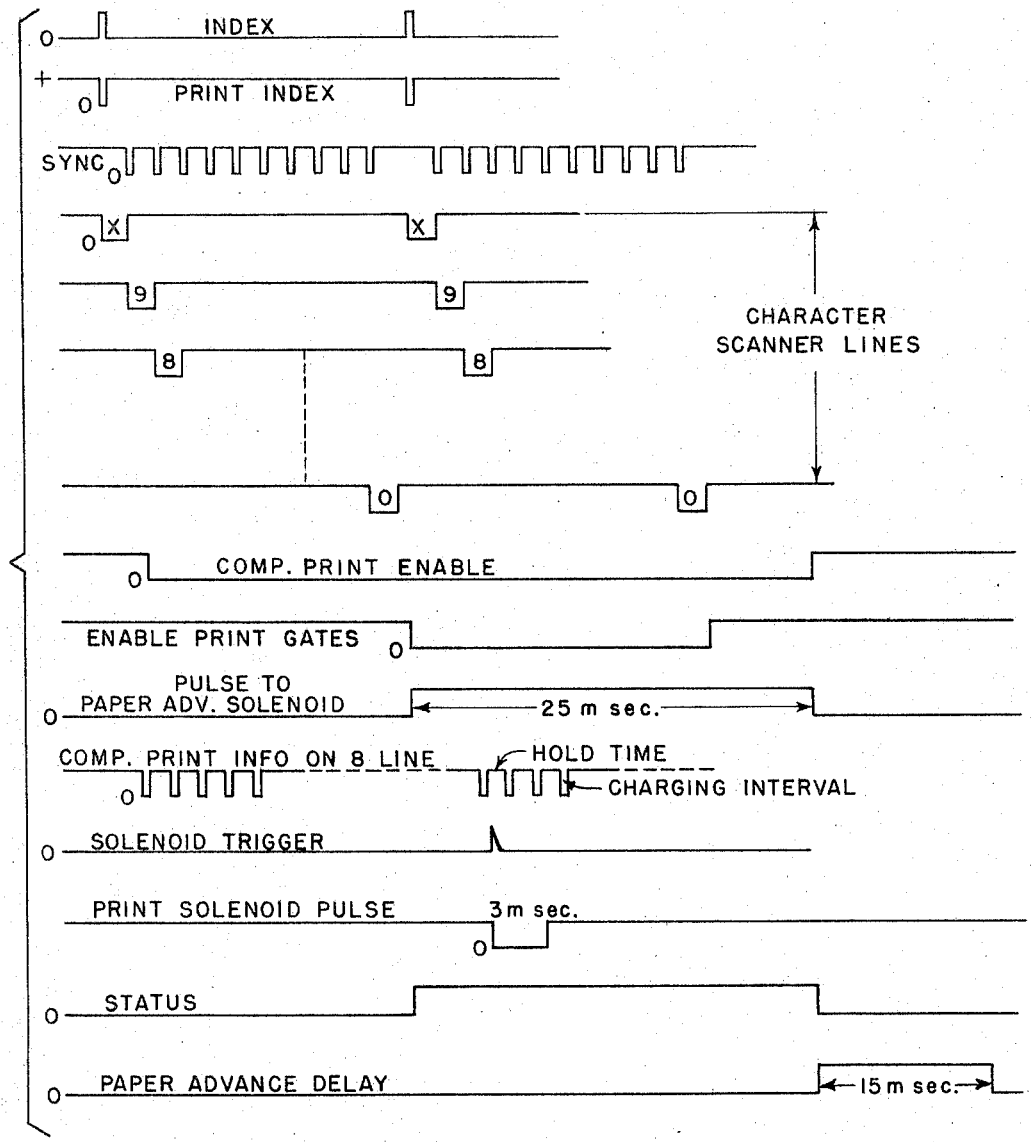
FIG. 2 shows the timing waveforms of signals at various points in the system of FIG. 1.

In the system block diagram of FIG. 1, the pertinent equipment of the controlled printer as described above with appropriate labels is shown at the right within the box labeled "Printer." The electronic control equipment controlled by information received from the computer and controlling operation of the printer is shown to the left in block diagrammatic form. In this equipment, the Sync and Index Pulse Generator shown in the box labeled SIG is controlled from the Reluctance Pickup of the Printer and generates index and sync signals, such as shown in the curves of FIG. 2, used for controlling the operation of the Character Scanner, shown by the box labeled CS, and the operation of the computer output Gate Sampler shown by the box labeled GS. The output lines X and 9 to 0, connected to different stages of the Character Scanner, respectively lead to one input of a different one of the AND gates $AG_X$ and $AG_9$ to $AG_0$, the other input of these gates being connected to different information output lines of the computer labeled computer PRINT INFO lines X and 9 to 0. Therefore, the gate $AG_9$ would have the Character Scanner 9 line and the computer PRINT INFO 9 line as inputs. The single output of each of these gates is connected to a separate storage capacitor $SC_X$ and $SC_9$ to $SC_0$ as indicated. All of these gates, the inputs and the outputs thereof and the storage capacitors form a Coincidence Matrix indicated within the dashed line box labeled CM.

A Scan Complete Generator SCG is connected to the last stage of the Character Scanner CS and is used with the 300 msec. Delay Generator DG1 to control the clearing of information from the Character Scanner CS. The electronic equipment also includes an Enable Flip-Flop $FF_{PE}$, a number of other gates including AND Print gate $AG_P$, Print Enable gate $AG_{PE}$ and computer Line Advance gate $AG_{LA}$ and the OR gate OG1; a plurality of driver circuits including Solenoid Drive SD1 controlling a solenoid in the Printer, a Paper Advance Driver PAD, and the Shear Solenoid Driver SSD; and the 15 msec. Paper Advance Delay circuit $D_{PA}$; which apparatus elements are operated under control of the information and command signals furnished by the computer. Also, a Status signal which indicates the status of the cycle within the Printer is transmitted to the input of the Print Enable gate $AG_{PE}$ to time the information and command signals transmitted therethrough.

The above-mentioned apparatus operates briefly in the following manner. The index pulse sets the Character Scanner CS to its first stage. The sync pulses then step the Character Scanner through its eleven stages in synchronism with the characters on the drum of the Printer. Since there are only ten sync pulses between index pulses, the Character Scanner would be on its last stage when the next index pulse arrived. To clear the Scanner, the Scan Complete Generator circuit SCG generates a signal approximately 1.5 msec. after the last stage comes on (1.5 msec. being the dwell time for each scanner position). The scan complete signal from the generator SCG triggers the 300 μsec. Delay Generator DG1 which in turn clears the scanner and sets the Print Enable Flip-Flop $FF_{PE}$ to the disabled condition.

When there is coincidence of information on both the output line from any stage of the scanner and the corresponding PRINT INFO line connected to a particular gate of the AND gates $AG_X$ and $AG_9$ to $AG_0$, a signal will pass through that gate and be stored in the associated information storage capacitor $SC_X$ or $SC_9$ to $SC_0$. When the Character Scanner steps to its next position, this stored information is passed to the Print gate $AG_P$. If this gate had been previously enabled by the print enable gate signal via the flip-flop $FF_{PE}$ and the AND $AG_{PE}$ controlled by the command signals produced by the computer and timed by the status signal from the Printer, a pulse passes through the Print gate $AG_P$ and triggers the Solenoid Driver SD1. The Solenoid Driver SD1 delivers a high energy pulse to a hammer-impelling solenoid in the Printer. The solenoid armature assembly impels the hammer toward the character drum and causes a collision between the hammer, paper, ribbon and print wheel character to print the appropriate character in the proper column of the customer's bill. The operation will be described in more detail later in connection with the description of one complete print cycle.

SYNC AND INDEX PULSE GENERATOR
(FIGS. 3 AND 4)

The sync and pulse generator act upon the information supplied by the reluctance pickup of the Printer to generate three signals: (a) a *Sync* pulse which steps the Character Scanner CS and also triggers the computer Gate Sampler GS; (b) a *Print Index* pulse which synchronizes the Print Enable gate $AG_{PE}$ so that the associated Print Enable Flip-Flop $FF_{PE}$ is only set at the start of the Character Scanner cycle; and (c) an *Index* pulse which sets the Character Scanner to its first stage after a clear pulse.

The pickup signals received from the Printer are amplified by the Pre-Amplifier PA comprising the transistor amplifying stages T1 to T3 so that at the point A in the output thereof ten small ramps are seen separated by a larger extended ramp (FIG. 4A). To obtain the Sync pulses, the signal at A is power amplified through transistor stages T4 and T5 producing .5 msec. negative-going pulses, at a 560 ohm impedance level, at point B (FIG. 4B).

The Discriminator Amplifier DA made up of transistor stages T6, T7 and T8 also acts on the signals at point A. When the extended pulse occurs, the negative edge charges capacitor C1 to 12 volts from the associated battery with the polarity indicated, cutting off transistor T7. Capacitor C1 slowly discharges through the assocaited resistor until the next extended pulse arrives. As shown by the curve opposite this point, riding on top of the discharge curve are positive ramps, one for each synch pulse. When the extended positive-going ramp occurs, it raises point C above approximately 1.8 volts and transistor T7 is turned on. When the extended ramp returns to its negative value, capacitor C1 is again fully charged to 12 volts cutting off transistor T7. Therefore, one negative-going Print Index pulse is seen for each extended ramp (FIG. 4C). The Index pulse is derived from the Print Index pulse via transistor stage T8. When T7 turns on, T8 also turns on to charge capacitor C2 so that a 50 μsec. positive index is seen.

PRINT GATE AND SOLENOID DRIVER (FIG. 5)

The Print gate $AG_P$ serves as a transmission gate for signals from the Coincidence Matrix CM. The gate is inhibited or enabled by the Print Enable gate signal at point C. When point C is at ground potential, transistor stage T10 is conducting and point B is clamped to B+ through the saturation resistance of T10 and forward conducting diode D7. The condition of T9 controlled at point A from the Coincidence Matrix CM will have no effect on point B, and the Print gate $AG_P$ is inhibited. If point C were to rise to B+, transistor T10 would be cut off and point B is controlled by T9. Transistor T9 is normally "on" due to the resistor connected from its base to ground. Point B is normally clamped to B+ with the absence of a signal at point A. If, at this time, a positive pulse from the Coincidence Matrix CM were to pass into point A, this would appear at the base of T9 and cut off that transistor. When T9 is cut off, point B falls to ground, and a negative pulse is passed via C3, D7 to trigger the 3 msec. monostable multivibrator comprising transistors T11, T12 and T13. The exact triggering level of T9 is set by the associated resistors.

The 3 msec. one-shot monostable multivibrator normally has its transistor T11 conducting. The voltage across the associated 20 ohm common emitter resistor is low enough to keep transistor T13 off. If the one-shot goes into its active state with transistor T12 conducting, the voltage at the base of T13 rises and T13 turns on for 3 msec. supplying approximtaely 6 amps. to the solenoid.

A Solenoid Driver such as described above is also used to activate the Shear Solenoid.

PAPER ADVANCE DRIVER (FIG. 6)

The Paper Advance Driver PAD delivers a fixed pulse width, high energy 25 msec. pulse to the (Kunke) rotary coil in the Printer, and also controls through the 15 msec. Paper Advance Delay circuit PAD the Status signal to the Print Enable Gate $AG_{PE}$ of the computer which indicates the condition of the Printer cycle. A detailed description of the circuit used to generate the 25 msec. power pulse and the Status signal is given in M. Felcheck application, Ser. No. 244,672, filed Dec. 12, 1962.

In the cricuit of FIG. 6, when a Paper Advance command signal from the computer passing through the Line Advance gate $AG_{LA}$ and the OR gate OG1 occurs at point C, an amplified 25 msec. positive pulse is seen at points A and B of the circuit. At point A, a high energy power pulse is delivered to an inductive load. At the end of 25 msec., an inductive spike is seen at point A. The STATUS signal at B is free of this spike due to the effect of the diode D14 and the associated resistor. When the voltage at A goes negative, D14 cuts off and only the positive pulse is generated at B as the STATUS signal.

CHARACTER SCANNER (FIG. 7)

The Character Scanner CS is cleared by the Scanner Clear signal and set to its first stage by each Index pulse generated by the generator SIG. Between Index pulses the Scanner is driven from stage to stage by the sync pulses also generated by SIG so that the Scanner output lines are activated in numeric succession in synchronism with the respective characters on the print wheels of the Printer. The Character Scanner employs a multi-stage unidirectional ring counter, such as disclosed in the copending application of W. J. Mahoney and N. N. Murthy, Ser. No. 184,766, filed Apr. 3, 1962, having a single active element (4-layer diode SD) for each stage, the operation of which is completely described in that application.

In the circuit of the Scanner, the networks composed of RN, DN and TN (the buffer transistors), such as shown in a typical one of the nine stages, act to isolate the Scanner from the loads on the output lines. When the first stage T17 is active, point A is at a low potential and the base of the emitter-follower transistor T14 is clamped to this voltage via the associated resistor and diode D15. Therefore, output line X, at point B, is held at a low potential. If the first transistor T17 in the Scanner stage is off or not active, point A is at a high potential and diode D15 is cut off. The base of transistor T14 is held at a high potential through the associated resistor, so that point B is also held at a high potential by follower action. Using this technique, no load current ever flows through the anode of the Shockley (4-layer) diode SD in each stage and the associated resistor RL (typical stage).

SCAN COMPLETE GENERATOR (FIGS. 7, 8 AND 9)

At the completion of each set of 10 Sync pulses, the Character Scanner CS has its last stage active. If coincidence occurs for the last stage or "zero" output line, the Scanner must be stepped so that information can pass through the coincidence circuit. In any case, the Scanner must be cleared before the occurrence of the next Index pulse.

To accomplish proper cycling, a network is added at the end of the Scanner which, when the last stage goes on, a time delay begins. After 1.5 msec., a Scan Complete pulse is generated which triggers the 300 $\mu$sec., one-shot delay generator DG1 (FIG. 1) which in turn clears the Scanner CS. The clearing of the Scanner is accomplished by giving the Scanner a very long step signal and allowing the internal information to be lost through discharge paths.

The Scan Complete circuit is shown attached to the last stage of the Character Scanner in FIG. 7. The circuit is recopied in FIG. 8.

To understand the operation of the circuit, assume that the last stage of the Scanner CS is not active and, therefore, point A of the Scan Complete Generator is at a high potential and transistor T18 is cut off. Points B and C are at the level determined by the associated resistors R2 and R3. The voltage at point C is given by:

$$V_C = B + \frac{R2}{R2+R3}$$

Now, if $R3 > R2$, $V_C$ is a small fraction of the supply voltage and the last stage of the Scanner CS becomes active, point A falls to a small voltage, transistor T18 turns on, clamping point B to approximately B+, and diode D16 is cut off. Capacitor C4 now charges through R3 until the breakdown potential of the silicon controlled switch SCS is reached, the breakdown potential of which is determined by the values of the resistors R4 and R5 associated with point D. The time to reach this potential is the time delay of the unit. FIG. 9 shows the various waveforms within the circuit of FIG. 8. The output is taken at point C where the negative-going edge of the ramp is utilized to trigger a one-shot multivibrator DG1 (FIG. 1).

COINCIDENCE MATRIX (FIG. 10)

The Coincidence Matrix CM translates the information received from the computer or other source into properly timed pulses so as to trigger the hammer firing circuits of the Printer and cause the appropriate character to be printed thereby. As indicated in FIG. 10, there are five sets of matrices in the coincidence circuit, one for each column, with eleven AND gates $AG_X$ and $AG_9$ to $AG_0$ in each matrix.

Coincidence is achieved as follows:

Pulses of information appear on one of the computer PRINT INFO lines in a column. Normally the Character Scanner output lines are at a high potential, and the gate storage capacitors SC cannot charge, viz., if point B in FIG. 10 is clamped to a high potential, SC1 will charge through the associated resistor and the impedance seen looking into the computer with the polarity indicated. When the computer pulse ceases SC1 will retain the charge as no discharge path is available. When the Scanner X line again goes back to its high potential, capacitor SC1 is rapidly discharged causing a positive pulse at C which cuts transistor T9 off. The reason for the use of the computer gate sampler GS is now apparent, because, if the computer output gate impedance were always there, then capacitor SC1 could also discharge through the ten parallel paths, and a much reduced pulse would be seen at point C leading to the Print gate $AG_P$. With the use of computer gate sampler GS, the computer output gate impedance is $R_g$ during sampling and effectively infinite during the time when information is passed out of the Coincidence Matrix CM. Diodes D1 through D11 act as noise suppression diodes for any cross-talk on the computer PRINT INFO lines.

PRINT ENABLE GATE AND ENABLE FLIP-FLOP (FIG. 11)

The Print Enable gate $AG_{PE}$ is an AND gate-trigger which acts upon computer information and internally generated computer command signals. The gate triggers the Enable Flip-Flop $FF_{PE}$ in proper time relationship to the Character Scanner CS. The Enable Flip-Flop $FF_{PE}$ in turn enables the Print gate $AG_P$ and triggers the Paper Advance Driver PAD through the OR gate OG1.

The diodes DA1, DA2 . . . and resistor RA comprise the negative-going AND gate $AG_{PE}$. If either of the inputs $E_i$ to these diodes are positive, the gate output $E_o$ is clamped to positive and the voltage across the Zener diode ZD1 is below the Zener conduction threshold. The PNP transistor T20 is held in its nonconducting state, the voltage drop across the stabistor diode DS being sufficient to reverse bias the input section of the transistor T20 and no output appears at the collector of T20.

When both input voltages $E_i$ are dropped to a negative potential, point $E_o$ will follow. If $E_o$ falls to more than approximately 13 volts below ES, the Zener diode ZD will start to conduct, causing T20 base current to flow. In actual practice, $E_i$ is caused to step 18 volts, in one microsecond, resting at a value of $+6$ volts with respect to ground. $E_o$ is not allowed to fall this far, being held to approximately $+10$ volts. The current through the resistor RA with 10 volts across it is 1 ma., which flows through the Zener diode ZD and becomes the base current of T20. At the worst case, $B=20$, a dynamic load current of 20 ma. can be supported. This dynamic load is provided by the charging current of CA through RA, and the base-emitter resistance of the associated flip-flop transistor (not shown) being turned on. The total of these series resistances is about 2 K$\Omega$; therefore, the initial charging current is limited to ES/2,000 or 12 ma.

As T20 goes into saturated conduction, the collector rises to a positive potential approximately 21.7 v.$=VT$. The negative-going gating input signal is therefore seen to be inverted, increased in current carrying capability and voltage, differentiated and applied to the base of the "off" flip-flop transistor as a positive-going pulse whose amplitude and duration is great enough to start the "off" transistor moving toward conduction. Circuit regeneration of the flip-flop assists in continuing the turn-on action.

LINE ADVANCE GATE (FIG. 12)

The Line Advance gate $AG_{LA}$ ANDS together various timing command signals and triggers the Paper Advance Driver PAD through OR gate OG1 (FIG. 1).

Transistor T21 is used as an emiter-follower so that the Line Advance circuit is presented with a low impedance plus trigger and the incoming signals to the AND gate presented with higher impedance. The RC network on the incoming computer line Advance acts as a noise filter.

COMPUTER GATE SAMPLER (FIG. 13)

The computer Gate Sampler acts to unload the Concidence Matrix CM when information is passed from the Coincidence Matrix to the Print gate $AG_P$. Ideally, the Coincidence Matrix desires to see zero impedance looking back into the computer PRINT INFO lines during the changing of the Coincidence Capacitors SC and infinite impedance at these lines during the passage of information out of the Matrix CM. In practice, during charge up, the impedange is $R_g$ (5.6K) in the computer and several megohms (an "off" transistor).

FIG. 13 shows the technique used to accomplish the above. Two time delay circuits A and B are used in cascade. The first delays the action of the sync pulses for 100 $\mu$sec. and the second enables the computer ring counter gates for a 500 $\mu$sec. sample time. The enabling of the gates is done by having the normally active output of time-delay B connected through the associated resistor and Zener diode ZD2 to the base of transistor T23. When the normally conducting output goes positive overcoming Zener ZD2, transistor T23 is turned on, enabling the computer ring counter gates via T24, D20 for column one. Transistor T24 is turned on by the internal action of the computer enable circuit as shown. The same situation exists for the remaining four columns.

After 500 $\mu$sec., T23 is turned off by the output of time delay DB falling below the conduction level of ZD2. Transistor T23 now remains off until 100 $\mu$sec. after information has passed out the Coincident Matrix CM, diodes D20 and D21 protect the emitter junction of T24 and T25 during the time that T23 is off and positive pulses can appear across it.

The waveforms of the sync pulses at various points in the circuit of FIG. 13 are shown by the associated curves of FIG. 13A.

INTERMITTENT RIBBON DRIVE

Because of the relatively short life of the printer ribbon in the Printer due to fold over, a special circuit is added so that the ribbon moves only during the time the Printer is active. When the Printer is not active the ribbon drive motor $R_P$ is off. To accomplish this intermittent driving of the ribbon motor, th ecircuit shown in FIG. 14 is used.

The circuit is placed across the Paper Advance Solenoid. When this solenoid is activated by the Paper Advance Driver PAD (FIG. 1), 25 msec. positive pulses appear at A. These pulses are rectified and smoothed by D22, R22 and C22 so as to energize relay L1. Contacts of the S1 switch are operated and power is applied to the A.C. reversible motor $M_P$ moving the ribbon, so that the only time the ribbon motor is active is when the paper is being driven in the Printer.

POWER SUPPLY DELAYS

Since sporadic line advancing and printing can occur upon system turn on, two time delays (not shown) are incorporated in the hammer supply and line advance supply. These delays allow the electronic circuits to settle down before power is applied. Both delays are of the thermal type giving aproximately a 5 second delay.

COMPLETE OPERATION ON THE PRINT CYCLE (FIGS. 1 and 2)

Assume that the control computer desires the number 8 to be printed in column 1 on the customer's bill. The computer will do two things: present pulses of information on the computer PRINT INFO line 8 and at some later time change the computer PRINT ENABLE signal from "0" to "1." Pulses are presented on the computer PRINT INFO line due to the action of the Gate Sampler GS. This circuit enables or samples the AND ring counter gates at the output of the computer at the sync frequency and 180° out of phase with the sync pulse. The sample time is approximately .5 msec. or 1/3 of the Character Scanner dwell time. Pulses are needed because of the Coincidence Matrix CM which passes its information at the same time as the sync pulse occurs. If information is on any computer PRINT INFO line at this time it loads down the Coincidence Matrix.

Any pulse generated by the Coincidence Matrix before the computer Print Enable signal occurs will not pass through the Print gate $AG_P$ due to the action of the Enable Flip-Flop $FF_{PE}$ which in its reset condition disables the Print gate $AG_P$.

All signals to the "Print Enable" gate $AG_{PE}$ are at their "1" levels except the computer "Print Enagle" signal and the "Print Index" signal. After the computer "Print Enable" goes to its "1" level, the first "Print Index" signal will cause an output from the "Print Enable" gate $AG_{PE}$ and set the Enable Flip-Flop $FF_{PE}$ to a state whereby the Print gate $AG_P$ is enabled and the Paper Advance Driver PAD is triggered.

The Character Scanner CS now activates its output lines in sequence. When the 8 line is activated, the pulse on the computer PRINT INFO 8 line passes through the coincidence gate and charges the INFO Storage Capacitor SC8. When the Character Scanner steps off position 8 a pulses is passed to the Print gate $AG_P$ which had been previously enabled. The Print gate $AG_P$ emits a pulse which triggers Solenoid Driver SD1, which causes a hammer in the Printer to slam against the paper, ribbon and character drum so as to print the numeric 8. The Character Scanner CS steps to its last stage whereupon the Scan Complete signal is generated by the Scan Complete Generator SCG which in turn triggers the Clear Delay circuit DG1. The Character Scanner CS is cleared by DG1 and the Enable Flip-Flop FF$_{PE}$ is reset after 300 μsec. This delay is needed so that the numeric 0, which is the last stage on the Scanner, has time to pass its pulse through the Print gate AG$_P$ before it is disabled by the Enable Flip-Flop FF$_{PE}$.

LINE ADVANCE (NO PRINTING)

To cause the Printer to advance one line without printing, the Computer Line Advance input to the gate AG$_{LA}$ is used. Since the Paper Advance Delay signal is normally at its "1" level when the Computer Line Advance signal changes to "1," a signal passes through the Line Advance gate AG$_{LA}$ and the OR gate OG1 and triggers the Paper Advance Driver PAD. The Paper Advance Driver PAD "cocks" the rotary PAPER ADVANCE Solenoid in the Printer and changes the STATUS signal from "1" to "0" for 25 msec. This solenoid is spring loaded. When power is applied to the solenoid, the spring is elongated. When power is removed, the return action of the spring drives the paper. The action of elongating the spring is referred to as "cocking."

At the end of this time the STATUS changes back to "1," signaling the Computer for new information and triggering the Paper Advance Delay circuit PAD which disables the Line Advance gate AG$_{LA}$ for 15 msec. so that the paper has time to shift before new input information is acted upon. Since the Rotary Solenoid in the Printer is activated for 25 msec. and then an additional 15 msec. is needed for paper shift, the minimum time to advance a line is 40 msec. or 25 lines per second.

PAPER SHEAR

To cause the Printer to shear the paper the computer Shear signal changes from "0" to "1." This triggers the Shear Solenoid Driver SSD which supplies a 15 msec. pulse to the Shear Solenoid in the Printer. The Print Enable gate AG$_{PE}$ and Line Advance gate AG$_{LA}$ are disabled during this time. These gates may be disabled also by a mechanical interlock with the cutter mechanism (not shown), so that no signals will be acted upon by the electronic controls immediately upon the occurrence of the Shear signal and until the completion of the mechanical shear cycle.

Various modifications of the features of the electronic circuits for controlling the Printer other than those which have been illustrated and described above which are within the spirit and scope of the invention will occur to persons skilled in the art.

What is claimed is:

1. In a data processing system, in combination with an electromechanical printer having a plurality of character printing controls, and a plurality of separate data sources each with an output information line, electronic circuit means for converting the data from said sources into electric signals suitable for operating said printer including means for generating a plurality of synchronizing (sync) pulses at a given frequency representing different operating positions of said controls in a printing cycle plus an index pulse at the start of each cycle; a multi-stage character scanner having an output for each stage, said scanner being set to its first stage by each index pulse and stepped through all its stages in response to the sync pules in synchronism with the respective characters on said conrtol; means also triggered by each sync pulse for sampling the output of said sources in turn to determine the presence of data therein and, if present, to apply the sampled information to the associated information line; a coincidence circuit comprising a plurality of gates each having as inputs thereto a different one of the stage outputs of said scanner and a different one of said information lines, and a single output for each of said gates including an individual storage capacitor; print gating means and associated printer driving means; the coincidence of information in both inputs to any gate causing the enablement of that gate to pass the information in the associated information line therethrough to charge the associated capacitor for storage therein; means responsive to the stepping of said scanner to the next stage position to cause the information in the charged capacitor to pass to said print gating means; and means responsive to a comamnd generated in said system to cause the enablement of the print gating means to pass a signal therethrough to the associated driving means to generate a high energy pulse for operating the printing controls.

2. The combination of claim 1, in which said system is a business billing system and said separate sources of data provide numerical information representing the total price of the quantity of a different commodity item sold to a customer on each single order computed by a computer, the characters on said controls are data-representing characters embossed on the printing wheels thereof including numerical figures ranging from zero to nine, and said command signals are binary direct current signals either of "1" or "0" levels issued at proper times by said computer under control of the operator thereof.

3. The combination of claim 1, in which said multistage scanner comprises a unidirectional ring counter.

4. The combination of claim 1, in which said sync and index pulses are generated from amplified pickup signals derived from a single multi-toothed, rotatable timer wheel attached to a printer driving said wheel having the proper tooth spacing at index point to provide the proper width index pulse.

5. The combination of claim 1, in which said circuit means also includes means connected to the output of the last stage of said scanner which generates a scan complete signal a given time after the last stage comes on, where said given time is equal to the dwell time of each scanner stage, and a delay generator having a delay time of a given value which is triggered by said scan complete signal to supply a very long step signal to the scanner and allow the internal sync information to be lost by suitable discharge paths therein, which clears the scanner.

6. The combination of claim 1, in which said sampling means provide pulses which sample output gates of said sources at the sync frequency and 180° out of phase with the sync pulse at approximately ⅓ of the scanner dwell time, pulses being needed because of the coincidence circuit which passes its information at the same time as the sync output occurs.

7. The system of claim 2, in which said coincidence circuit comprises a number of sets of matrices, one for each column in the customer's bill, with a plurality of AND gates in each matrix each connected to one of the 0 to 9 outputs of a different stage of the scanner, and an additional AND gate connected to another stage of the scanner for use in connecion with printing an X in the proper location on the customer's bill to indicate that the order is to go out and therefore is to be wrapped.

8. The combination of claim 1, in which the sampling means acts to unload the coincidence circuit when information is passed therefrom to the print gating means, and said sampling means provides definite small impedance when sampling and an infinite impedance during the time when the information is passed from the storage capacitor to the print gating means to prevent discharge through a number of paths in parallel to the input of the print gating means which would unduly reduce the pulse input thereto.

9. The system of claim 2, in which said sampling means utilizes two time delay circuits in cascade the first of which is used to delay the action of the sync pulses for a first delay time and a second circuit to enable output gates of each of said sources for a second sample delay time, which delay circuits are connected through means including a first Zener diode and a pair of transistors to each of the output gates of said sources, and the enabling of an output gate is accomplished by having the normally active output of said second time delay circuit connected through said first Zener diode so that when the normally conductive output goes positive overcoming that diode, the first transistor is turned on to enable ring counter gates in said sources via the second transistor and a second Zener diode for a particular column of the bill, the second transistor being turned on by the internal action of the system and after the second delay time the first transistor is turned off by the output of the second time delay circuit falling below the conductive level of the first Zener diode and the first transistor remains off until a given time after information is passed out of the coincidence circuit.

10. The combination of claim 1, in which said circuit means also includes an enable flip-flop means associated with said print gating means, which is normally in the reset condition so that the print gating means is normally disabled, a print enable AND gate, and a paper advance driving means connected to said printer, and a command enable print signal of the "1" level transmitted through the print enable gate is employed to set the enable flip-flop means to a state whereby the print gating means is enabled and the paper advance driving means is triggered.

11. The combination of claim 10, in which the printer furnishes a Status signal indicating the status of the printing cycle within said printer, which operates on the input to said print enable AND gate to time the information and command signals transmitted therethrough.

12. In a business billing system, in combination with a printer including a hammer-impelling solenoid, a rotatable drum made up of a number of printing wheels for each column of a customer's bill with numerical characters running from 0 to 9 thereon and a timer gear on said drum wtih a number of sections of teeth thereon separated by gaps; a plurality of sources of signals respectively representing price information for the sale of different commodity items on single orders from customers, if included in an order and print information lines for each source; and electronic circuit means for operating said printer to print the prices of the quantity of the items on each order on a customer's bill, including means responsive to the rotation of each tooth in said gear past a given point to generate a synchronizing (sync) pulse, plus an index pulse for each of said gaps; a multistage scanner which is set to the first stage by each index pulse and is stepped through all of its stages in turn in response to each sync pulse in numeric succession in synchronism with the respective characters on the printer wheels and an output line for each of said stages; a coincidence matrix including a plurality of AND gates having as inputs thereto a different one of the scanner output lines and a different one of said print information lines, and a single output for each of said gates including an individual storage capacitor; means also triggered by each sync pulse for sequentially sampling said sources in turn to determine which has price information thereon and, if present, to apply the sampled information to the associated print information line; print gating means and associated solenoid driving means; the coincidence of information on both the inputs of a particular gate causing the enabling of that gate to transmit the applied print information therethrough to the associated storage capacitor for storage therein; means responsive to the stepping of said scanner to the next stage position to cause the stored information to pass to the print gating means; and means responsive to a command signal generated in said systems for enabling the print gating means at the proper time to cause a pulse to pass through that means and trigger the associated solenoid driving means which delivers a high energy pulse to said hammer-impelling solenoid of said printer to print the appropriate characters in the proper column of said printer.

13. The combination of claim 10, in which said circuit means also includes a line advance AND gate, an OR gate, and a paper advance delay circuit connected between the output of the paper advance driving means and the input to the print enable gate, and to cause the printer to advance one line without printing, since the paper advance delay signal to said print enable gate is normally at its "1" level when the line advance command signal changes to the "1" level, a signal passes through the line advance gate and said OR gate and triggers the paper advance driving means which "cocks" a solenoid in the printer to change the Status signal from a "1" level to a "0" level for approximately 25 msec, and at the end of this time the Status signal changes back to the "1" level signaling the computer or other signal source for new information and triggers the paper advance delay circuit which disables the line advance gate for 15 msec. so that the paper has time to shift in the printer before new information is acted upon.

14. The combination of claim 10, in which said circuit means includes a shear signal driver means which under control of a common pulse supplies a pulse of approximately 15 msec. duration to paper shearing means in the printer while the print enable gate and line advance gate are disabled during this time interval.

15. The combination of claim 10, in which the sync and index pulse generating means also generates a print index pulse derived by the amplifier pickup signal from the printer, which print index pulse is used to synchronize the print enable gate so that the enable flip-flop is set only at the start of each scanner cycle.

16. In the combination of claim 10, in which the printer includes a printer ribbon having a relatively short life due to fold-over, and an A.C. reversible motor for driving the ribbon, a special circuit is added so that the ribbon moves only during the time that the printer is active and when the printer is not active the ribbon drive motor is off; said circuit being placed across the paper advance solenoid of the printer so that when that solenoid is activated by said paper advance driving means, a short positive pulse appears at the solenoid, a rectifier and associated capacitor and resistor for rectifying and smoothing these pulses, a power supply for said motor and switching means controlled by the rectified pulses for applying power from said supply to said motor moving said ribbon, so that the only time the ribbon motor is active is when the paper is being driven in the printer.

No references cited.

WILLIAM B. PENN, *Primary Examiner.*